(12) United States Patent
Edmonds et al.

(10) Patent No.: US 10,678,515 B1
(45) Date of Patent: Jun. 9, 2020

(54) SIMPLIFYING AND REUSING VISUAL PROGRAMMING GRAPHS

(71) Applicant: Amazon Technologies, Inc., Seattle, WA (US)

(72) Inventors: Michael Edmonds, Herndon, VA (US); Luis René Sempé Sosa, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 15/270,441

(22) Filed: Sep. 20, 2016

(51) Int. Cl.
*G06F 8/34* (2018.01)
*G06F 8/36* (2018.01)
*G06F 8/71* (2018.01)

(52) U.S. Cl.
CPC .............. *G06F 8/34* (2013.01); *G06F 8/36* (2013.01); *G06F 8/71* (2013.01)

(58) Field of Classification Search
CPC ............... G06F 8/34; G06F 8/36; G06F 8/71
See application file for complete search history.

(56) References Cited

U.S. PATENT DOCUMENTS

| 7,428,542 | B1* | 9/2008 | Fink .................... G06F 3/038 |
| 8,032,940 | B1* | 10/2011 | Dhanani ............ G06F 21/6218 |
| | | | 713/191 |
| 2003/0159133 | A1* | 8/2003 | Ferri ................. G06F 11/3636 |
| | | | 717/130 |
| 2005/0071347 | A1* | 3/2005 | Chau ..................... G06F 17/218 |
| 2009/0030863 | A1 | 1/2009 | Stanfill et al. |
| 2009/0063517 | A1* | 3/2009 | Wright ............. G06F 17/30274 |
| 2011/0161886 | A1 | 6/2011 | Thomson et al. |
| 2013/0239089 | A1 | 9/2013 | Ekstein et al. |
| 2014/0040855 | A1* | 2/2014 | Wang ....................... G06F 8/34 |
| | | | 717/107 |
| 2014/0223413 | A1* | 8/2014 | Ge ........................... G06F 8/34 |
| | | | 717/109 |
| 2014/0359589 | A1 | 12/2014 | Kodosky et al. |
| 2015/0160926 | A1 | 6/2015 | Larson et al. |

(Continued)

OTHER PUBLICATIONS

U.S. Appl. No. 15/270,520, filed Sep. 20, 2016, Sosa et al.

(Continued)

*Primary Examiner* — Wei Y Zhen
*Assistant Examiner* — Amir Soltanzadeh
(74) *Attorney, Agent, or Firm* — BakerHostetler

(57) ABSTRACT

Techniques for simplifying and reusing visual programming graphs are described herein. In some examples, visual programming graphs may be simplified by decoupling execution signals from data resolution. Execution of a particular node may be triggered through a representation of a signal sent from a signal output slot of another node to a signal input slot on the node being triggered. Additionally, evaluation of data values may be represented by a connection between a data output slot on the node providing the data value to a data input slot on the node receiving the data value. Another technique for simplifying visual programming graphs may include combining and/or collapsing of multiple selected visual programming nodes into a single reusable visual programming node. In some examples, reusable combined visual programming nodes may be exposed using unlocked versions and/or locked versions.

12 Claims, 12 Drawing Sheets

(56) References Cited

U.S. PATENT DOCUMENTS

2016/0054982 A1    2/2016   Itani et al.
2016/0062799 A1    3/2016   Stanfill et al.
2016/0092462 A1*   3/2016   Raj ..................... G06Q 10/101
                                                                                                707/704

OTHER PUBLICATIONS

Chen et al.; "Large Graph Processing in the Cloud"; SIDMOD; Jun. 2010; p. 1123-1126.
Zhong et al.; "Medusa: Simplified Graph Processing on GPUs"; IEEE Transactions on Parallel and Distributed Systems; vol. 25; Jun. 2014; p. 1543-1552.
Zhang et al.; "Compiled Visual Programs by VisPro"; Proceedings of the Pan-Sydney area Workshop in Visual Information Processing; Jun. 2004; p. 113-117.

* cited by examiner

SIMPLIFYING AND REUSING VISUAL PROGRAMMING GRAPHS

BACKGROUND

The widespread use of visual programming techniques has increased dramatically in recent years. In some examples, visual programming techniques may allow developers to express complex computing operations using intuitive and familiar visual diagrams. Additionally, in some examples, visual programming techniques may allow developers to design functionality for a particular execution environment or other context without requiring the developers to become proficient experts in the underlying programming languages or services that may be employed by those contexts. While visual programming techniques may provide a number of advantages, there may also be certain drawbacks and limitations associated with existing visual programming techniques. For example, in some cases, it may sometimes be unclear exactly which order nodes in a visual programming graph may be traversed, which may potentially lead to confusion, inefficiency, and unreliability when the graph is executed. Additionally, existing visual programming techniques may be limited with respect to the ability to associate a node in the graph with related data. Furthermore, some existing visual programming techniques may offer few, if any, options for simplifying, reusing, and/or standardizing visual programming graphs, often requiring developers to replicate each other's work and potentially resulting in large and complex diagrams that may be difficult to parse and comprehend.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
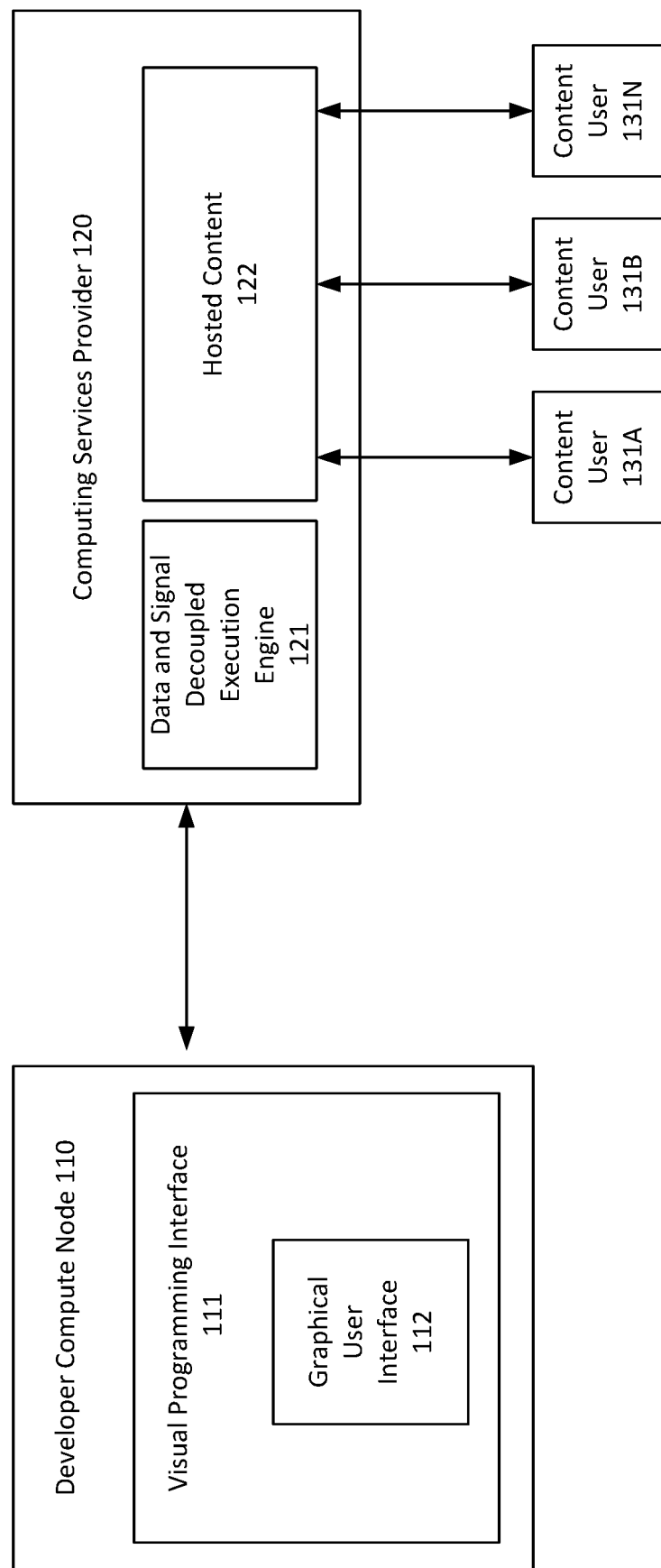
FIG. 1 is a diagram illustrating an example data and signal decoupled visual programming system that may be used in accordance with the present disclosure.

Techniques for simplifying and reusing visual programming graphs are described herein. In some examples, the techniques described herein may be used in connection with visual programming graphs used to perform functionality in a wide variety of computing contexts, such as video games, other interactive applications, and many other contexts. Visual programming graphs may, for example, be simplified by decoupling execution signals from data resolution. In particular, in some cases, nodes generated within a visual programming interface may include various different types of slots in order to represent different relationships and behaviors. In particular, a signal input slot may be employed to receive input signals, from another node, to transfer state to, and trigger execution of, the receiving node. A signal output slot may be employed to send output signals to transfer state away from a sending node and to trigger execution of another node. A data input slot may be employed for a node that is being executed to receive one or more data values from one or more other nodes. A data output slot may be employed for a node to provide data values to one or more other nodes. Thus, in some examples, execution of a particular node may be triggered through a representation of a signal sent from a signal output slot of another node to a signal input slot on the node being triggered. Additionally, evaluation of data values may be represented by a connection between a data output slot on the node providing the data value to a data input slot on the node receiving the data value.

In some examples, a visual programming graph may be executed using a frame-by-frame execution process in which, at any given frame, one or more nodes may be activated and executed. During that frame, the activated and executed nodes may, in turn, provide output signal to trigger activation and execution of one or more subsequent nodes during one or more subsequent execution frames. This process may be repeated until execution of the node graph is completed. In some cases, when a particular node is triggered via a signal input slot for execution, each data provider node that is connected to the triggered node (e.g., directly or indirectly through one or more other data provider nodes) may be activated and processed to provide data values that are used (e.g., directly or indirectly) by the triggered node. In some examples, the triggered node and its directly and indirectly connected data provider nodes may be collectively activated and processed during the same execution frame. This may help to ensure that data values are provided to the given node when needed and that the provided data values are current (e.g., up-to-date and/or not stale or expired).

Additionally, in some examples, prior to execution of a visual programming graph, the visual programming graph may be analyzed in order to generate one or more execution sequences for the graph. In some examples, an execution sequence may be generated for each node in the graph with one or more connected signal input slot triggers. Specifically, for a particular signal input slot-triggered node, the node may be examined, for example using a depth-first search, to identify the data provider nodes that are directly or indirectly connected to the triggered node and the relationships among the data provider nodes and the triggered node. An execution sequence for the triggered node and the data provider nodes may then be determined based, at least in part, upon those relationships. For example, in some cases, the execution sequence may be initiated by activating and processing one or more nodes in the execution sequence that are not dependent on another node, may then continue by activating and processing one or more nodes in the execution sequence that are dependent on one or more activated and processed nodes, and may continue until each of the data provider nodes and the triggered node have been activated and processed. In some examples, determination of one or more node execution sequences prior to execution of the visual programming graph may improve efficiency and reduce the start-up time delay required prior to graph execution.

Another technique for simplifying visual programming graphs may include combining and/or collapsing of multiple selected visual programming nodes into a single reusable visual programming node, referred to hereinafter as a visual programming slice. In some examples, a visual programming slice may be generated by receiving a selection of a set of programming nodes for inclusion in the slice, parsing the set of nodes to identify their associated inputs, outputs, and associated computing functions, de-duplicating the associated inputs and outputs, and then combining and/or collapsing the set of nodes into the visual programming slice. The resulting visual programming slice may be executable to trigger execution of a respective set of computing instructions represented by the underlying set of nodes in association with the inputs and outputs. In some examples, visual programming slices may improve efficiency by allowing sets of visual programming nodes to be instanced, used as templates, re-expanded, customized, modified, reduced, enlarged, and/or extended as needed. The use of visual programming slices may also, in some examples, reduce the size and complexity of visual programming graphs and allow graphs to easily inherit properties and other behaviors from one another.

In some examples, visual programming slices may be exposed using unlocked versions and/or locked versions. In particular, in some cases, an unlocked version of a slice may allow both the underlying set of visual programming nodes and the respective set of computing instructions associated with the slice to be exposed and accessible to one or more users. By contrast, in some cases, a locked version of a slice may prevent both the underlying set of visual programming nodes and the respective set of computing instructions associated with the slice from being exposed and accessible to one or more users. In some examples, unlocked versions of a slice may be provided, in some cases without compensation, by a slice developer to other users working in the same company, organization, project, or other common organization or enterprise. The unlocked version of the slice may be advantageous, for example by allowing the slice to be easily modified for various particular contexts. By contrast, in some examples, locked versions of a slice may sometimes be provided, by a slice developer to other users in exchange for compensation or other considerations. The locked version of the slice may be advantageous, for example by allowing the functionality of the slice to be provided to various different users without exposing the underlying instructions for achieving that functionality. In some examples, a locked slice may be provided to a user along with an encrypted or otherwise secured set of computing instructions for implementing the locked slice. In other examples, the computing instructions for implementing the locked slice may be executed at one or more secure locations and/or devices that are not accessible to unauthorized users.

FIG. 1 is a diagram illustrating an example data and signal decoupled visual programming system that may be used in accordance with the present disclosure. As shown in FIG. 1, a developer compute node 110 and content users 131A-N communicate with a computing services provider 120. Developer compute node 110 and content users 131A-N may communicate with computing services provider 120 using one or more electronic communications networks, for example using one or more local area networks (LANs) and/or one or more wide area networks (WANs) such as the Internet. In some examples, developer compute node 110 may be operated by a content developer, such as a cloud-based video game developer. As also shown in FIG. 1, computing services provider 120 hosts execution of hosted content 122. In some examples, hosted content 122 may be content that is developed by the developer that operates developer compute nodes 110. For example, hosted content 122 may include cloud-based video game content developed by the operator of developer compute node 110. Content users 131A-N may be users that access and participate in the execution of hosted content 122. For example, if hosted content 122 includes cloud-based video game content, content users 131A-N may include players that access and participate in the execution of the cloud-based video games.

In some examples, to execute and allow access to hosted content 122, computing services provider 120 may operate large numbers of connected servers, for example executing in various data centers and/or other locations that may be remote and/or local with respect to one another. Some example computing service provider systems, including services that employ virtual machines and other related components, are described in detail below, for example with respect to FIG. 11. It is noted that, although only a single developer compute node 110 is shown in FIG. 1, computing services provider 120 may host any number of different types of content for any number of different developers. For example, in some cases, computing services provider 120 may host multiple different video games developed by multiple different developers, as well as multiple different types of other content (e.g., business and productivity content, other media and entertainment content, etc.) developed by multiple different developers.

As shown in FIG. 1, developer compute node 110 includes a visual programming interface 111 that allows the developer to visually define and generate various computing operations and to submit the computing operations for execution by computing services provider 120. The computing operations that may be generated using visual programming interface 111 may include, for example, computing operations related to the execution of the developer's hosted content 122 that is executed by the computing services provider 120. As also shown in FIG. 1, visual programming interface 111 includes a graphical user interface (GUI) 112 that visually displays various graphical elements that may be used to define and build computing operations for submission to computing services provider 120. As will be described in greater detail below, the visual programming interface 111 may allow developers to define computing operations based, at least in part, on various nodes that may represent various sub-operations or other functionality associated with a computing operation. The visual programming interface 111, via GUI 112, may display graphical indications of the nodes, as well as graphical indications of signal inputs, signal outputs, data inputs (e.g., references), data outputs (e.g., properties), and other features of various nodes.

Computing operations that are defined and generated using visual programming interface 111 may be submitted to computing services provider 120 for execution on the provider computing systems. In particular, as shown in FIG. 1, computing services provider 120 includes data and signal decoupled execution engine 121 for executing computing operations generated and submitted by visual programming interface 111. As will be described in greater detail below, data and signal decoupled execution engine 121 allows decoupling of data resolution from execution signals during the execution of a visual programming graph. As will also be described in detail below, this decoupling of data resolution from execution signals may simplify execution of the visual programming graph, provide greater reliability and predictability, and help to ensure that current and up-to-date data values are provided when needed to a node that is triggered for execution.

Figure 2:
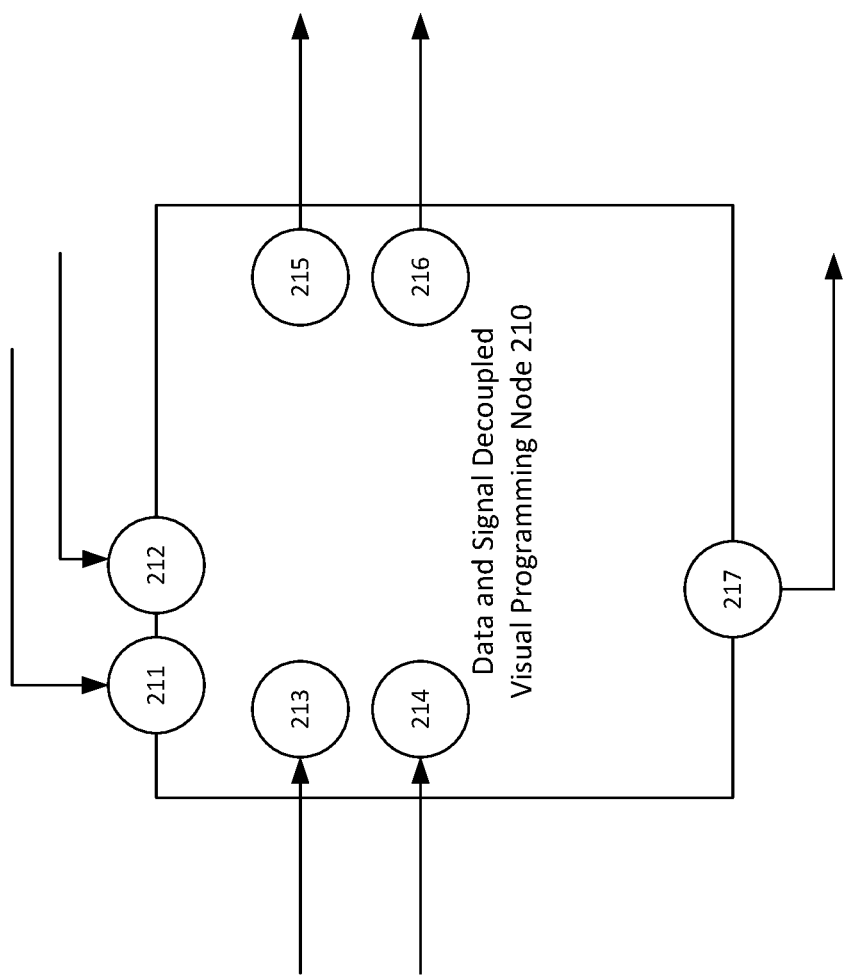
FIG. 2 is a diagram illustrating an example data and signal decoupled visual programming node that may be used in accordance with the present disclosure.

Referring now to FIG. 2, an example data and signal decoupled visual programming node 210 will now be described detail. In particular, node 210 is a visual programming node which may be generated and manipulated using interfaces such as visual programming interface 111 and GUI 112 of FIG. 1. In the example of FIG. 2, node 210 includes slots 211-217, which may be used to represent different relationships and behaviors that will be described below. Specifically, slots 213 and 214 are signal input slots that may be employed to receive input signals, from another node, to transfer state to, and trigger execution of, node 210. In some examples, for ease of identification, signal input slots may typically be located along the top-left side of a visual programming node. Slots 215 and 216 are signal output slots that may be employed to send output signals to transfer state away from node 210 and to trigger execution of another node. In some examples, for ease of identification, signal output slots may typically be located along the top-right side of a visual programming node. Slots 211 and 212 are data input slots that may be employed in order for node 210 to receive one or more data values from one or more other nodes. The received data values may include, for example, references, numerical values, and other data values. In some examples, for ease of identification, data input slots may typically be located along the top of a visual programming node. Slot 217 is a data output slot that may be employed for node 210 to provide data values to one or more other nodes. The provided data values may include, for example, properties, numerical values, and other data values. In some examples, for ease of identification, data output slots may typically be located along the bottom of a visual programming node. It is noted that the areas of a node (e.g., top, bottom, side, etc.) at which different types of slots may be located is merely one example technique for slot type identification and that any combination of these or other techniques may also be employed, such as different slot shapes, colors, sizes, etc.

Figure 3:
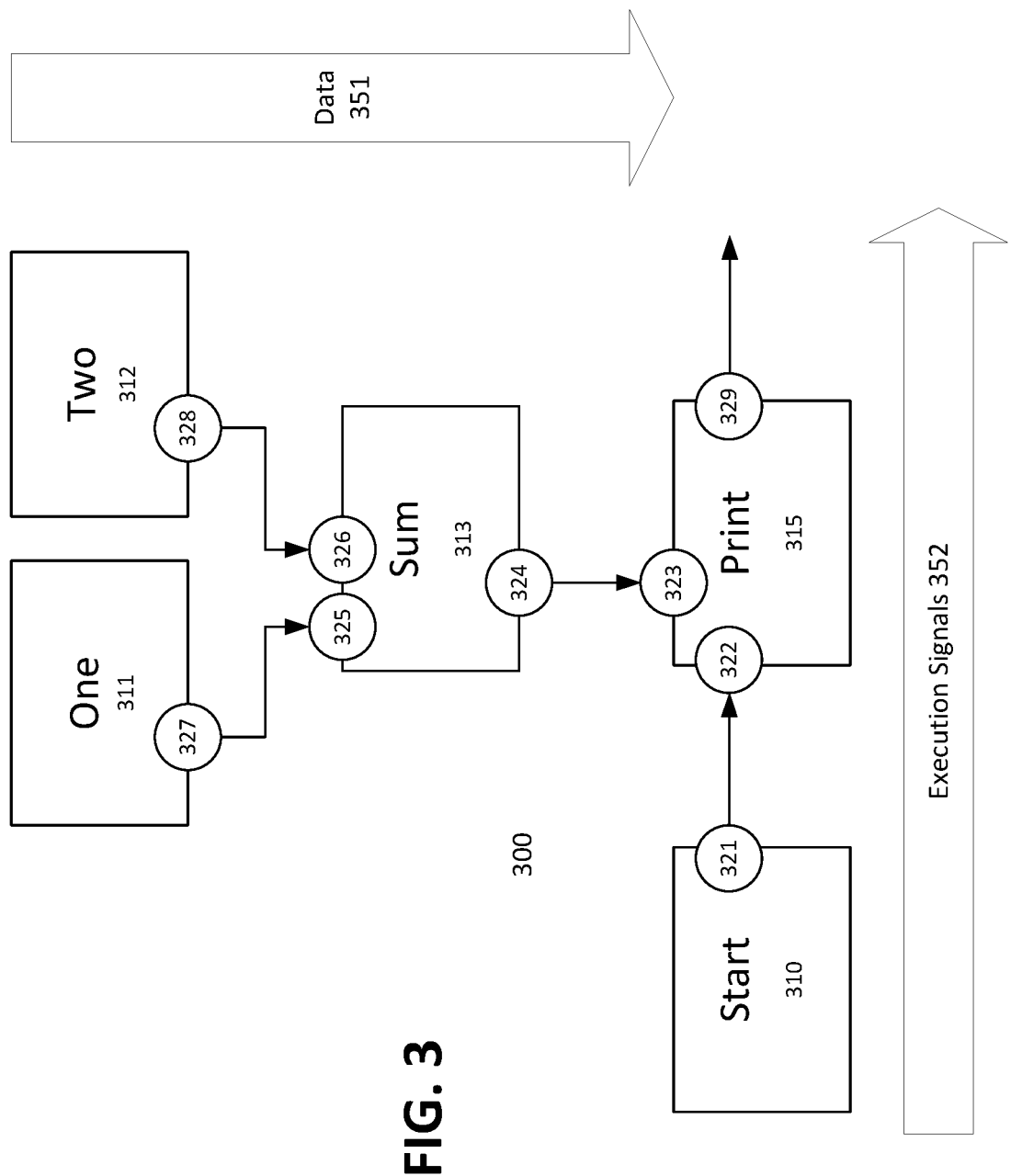
FIG. 3 is a diagram illustrating an example visual programming data and signal directionality that may be used in accordance with the present disclosure.

Referring now to FIG. 3, example visual programming data and signal directionality will now be described detail. In particular, in the example of FIG. 3, START node 310 serves as the entry point into the graph 300. START node 310 may, for example, be a stateless node that may immediately transition into any connections, which, in this example, includes a connection between signal output slot 321 of START node 310 and signal input slot 322 of PRINT node 315. Specifically, an execution trigger signal sent from slot 321 to slot 322 may cause PRINT node 315 to be executed. As shown in FIG. 3, PRINT node 315 has a connection through its data input slot 323 to SUM node 313. SUM node 313, in turn, has a connection through its data input slots 325 and 326 to ONE node 311 and TWO node 312. Thus, it can be determined that PRINT node 315 has three data provider nodes 311, 312 and 313 upon which PRINT node 315 directly or indirectly depends. Accordingly, in the example of FIG. 3, ONE node 311 and TWO node 312 may be activated to provide their respective numerical values of one and two through their respective data output slots 327 and 328. These values may be received by SUM node 315, which may be activated to SUM the data values of one and two (to a summed value of three) and provide the summed value of three to PRINT node 313 through data output slot 324. PRINT node 315 may then be activated to PRINT the summed value of three, and then, in turn, send a resulting output trigger signal through signal output slot 329 to a subsequent node (not shown). Thus, in the example of FIG. 3, execution signals for triggering node execution may flow from left to right across graph 300 as indicated by directional arrow 352. By contrast, data values for resolution by executing nodes may flow from top to bottom across graph 300 as indicated by directional arrow 351. It is noted that the directions indicated by arrows 351 and 352 are merely examples and that different directionalities may be employed for data resolution, execution signals, and/or other visual programming features or behaviors.

Figure 4:
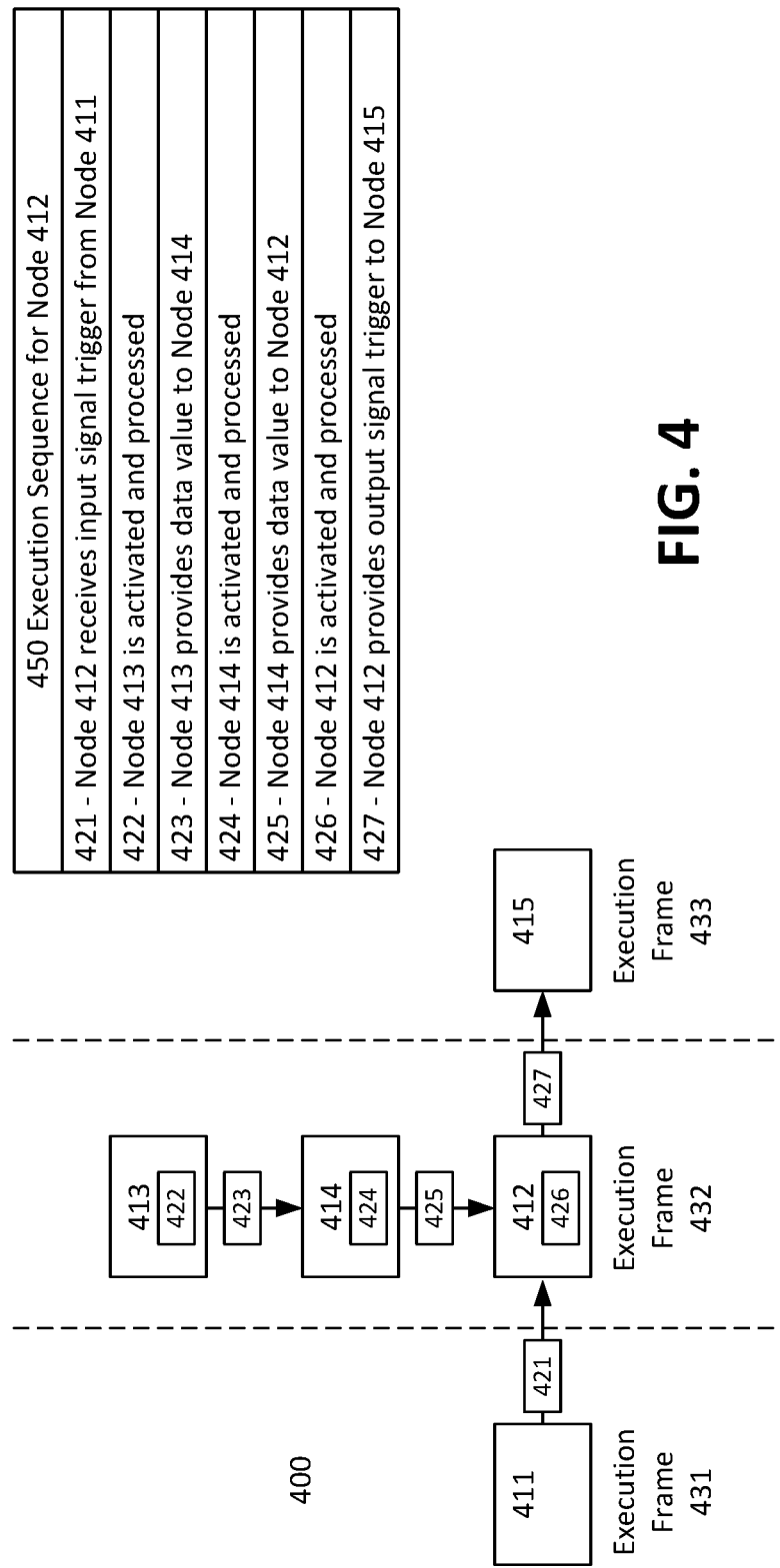
FIG. 4 is a diagram illustrating an example node execution sequence that may be used in accordance with the present disclosure.

Referring now to FIG. 4, an example node execution sequence will now be described in detail. In particular, FIG. 4 depicts an execution sequence 450 for visual programming node 412 included in visual programming graph 400 at the bottom-left of FIG. 4. As shown, graph 400 includes nodes 411-415. In this example, execution of node 412 is triggered via an input activation trigger signal from node 411, as indicated by the left to right directionality of the arrow from node 411 to node 412. Additionally, execution of node 415 is triggered via an input activation trigger signal from node 412, as indicated by the left to right directionality of the arrow from node 412 to node 415. Furthermore, node 413 is a data provider node that provides a data value to node 414, as indicated by the top to bottom directionality of the arrow from node 412 to node 415. Additionally, node 414 is a data provider node that provides a data value to node 412, as indicated by the top to bottom directionality of the arrow from node 414 to node 412.

In some examples, prior to execution of graph 400, it may be analyzed in order to generate one or more execution sequences. In some examples, an execution sequence may be generated for each node with one or more connected signal input slot triggers, which, in this example, would include nodes 412 and 415. For example, signal input slot-triggered node 412 may be examined, for example using a depth-first search, to identify the data provider nodes to which it is directly or indirectly connected (i.e., nodes 413 and 414) and the relationships among the data provider nodes and node 412. An execution sequence may then be determined based, at least in part, upon those relationships. For example, in some cases, the execution sequence may be initiated with activation and processing of one or more nodes that are not dependent on another node (i.e., node 413), may then continue with activation and processing of one or more nodes that are dependent on one or more activated and processed nodes (e.g., node 414 will be dependent on one or more activated and processed nodes once node 413 is activated and processed), and may continue until each data provider node and the signal input slot-triggered node 412 have been activated and processed (e.g., node 412 will be dependent on one or more activated and processed nodes once node 414 is activated and processed). In this context, a given node may be considered dependent on one or more nodes from which the given node receives one or more data values.

Accordingly, as shown in FIG. 4, execution sequence 450 is triggered at action 421, at which node 412 receives an input signal trigger from node 411. At action 422, node 413 is activated and processed to obtain its data value. At action 423, node 413 provides its data value to node 414. At action 424, node 414 is activated and processed to obtain its data value based, at least in part, on the data value provided by node 413. At action 425, node 414 provides its data value to node 412. At action 426, node 412 is activated and processed. At action 427, node 412 provides an output signal trigger to node 415. The output signal trigger provided by node 412 to node 415 may be based, at least in part, on the data value provided by node 414. In some examples, node 415 may have one or more connected data provider nodes (not shown in FIG. 4) and may have a separate execution sequence determined for it and its connected data provider nodes.

In the example of FIG. 4, visual programming graph 400 is executed using a frame-by-frame execution process in which, at any given frame, one or more nodes may be activated and executed. During that frame, the activated and executed nodes may, in turn, provide output signals to trigger activation and execution of one or more subsequent nodes during one or more subsequent execution frames. This process may be repeated until execution of the graph 400 is completed. For example, in a first execution frame 431, node 411 is activated and executed, which results in an activation trigger signal being sent to a signal input slot of node 412. Accordingly, in a subsequent execution frame 432, node 412 is activated and executed, which results in an activation trigger signal being sent to a signal input slot of node 415. Node 415 is then activated and executed in another subsequent execution frame 433.

When a particular node is triggered via a signal input slot for execution, each data provider node that is connected to the triggered node (e.g., directly or indirectly through one or more other data provider nodes) may be activated to provide data values that are used (e.g., directly or indirectly) by the triggered node. In some examples, the triggered node and its directly and indirectly connected data provider nodes may be collectively activated and executed during the same execution frame. For example, as shown in FIG. 4, node 412 and its connected data provider nodes 413 and 414 are all executed during the same execution frame 432. This may help to ensure that the data values from nodes 413 and 414 are available when needed and that the provided data values are current (e.g., up-to-date and/or not stale or expired). For example, consider the scenario in which graph 400 is executed in association with a video game and data provider node 313 provides a data value corresponding to a character's current location within a virtual space of the video game. Now suppose that node 412 uses this location value in some manner, such as to generate an explosion at the character's current location. If node 413 is executed in a prior execution frame from node 412, then the location value provided by node 413 may be out of date by the time that it is processed by node 412. This may result in node 412 generating an explosion at a location at which the character has since moved away from and is no longer relevant to the game.

In some examples, at least one node in a visual programming graph may include a signal input slot, a signal output slot, a data output slot, a data input slot and/or other features generated based, at least in part, on an evaluation of a definition of a component in an entity-component system. For example, an entity-component system may include entities that may represent objects within a virtual space of a video game, such as characters, weapons, animals, structures, and the like. Each such entity may include one or more components that may represent aspects of the entity. For example, a particular character within a video game may have a respective entity that may include components such as a mesh render component, a health component, an inventory component, and many others. As a particular example, a health component may, in turn, include a definition that defines various functions and behaviors associated with the health component, such as functions for setting, increasing, and decreasing a health value, providing a current health value, and behaviors for responding to a change in the health value. In some examples, a developer may use a visual programming interface to request that a particular entity be added into a visual programming graph. In response, the visual programming interface may evaluate definitions of components within the entity in order to build a visual programming graph for the developer that is associated with the requested entity. For example, the interface may evaluate a definition for the health component described above, and may generate one or more visual programming nodes, or portions thereof, that correspond to the health component. In particular, in some examples, the one or more visual programming nodes may include signal input slots, signal output slots, data input slots, data output slots and/or other features that correspond to the health component. For example, a node associated with increasing or decreasing health may have certain inputs that trigger the increase or decrease of health, while a node associated with providing a current health value may consume the current health value as a data value from another node. As another example, a node associated with behaviors for responding to a change in the health value may be triggered based on the other nodes associated with increasing or decreasing of health. In some examples, in order to allow the component definitions to be efficiently evaluated by the visual development interface, the visual development interface may expose various formats, languages, and/or instructions for defining of components in a manner that may be parsed and understood by the visual development interface, such as via an application programming interface (API), a software development kit (SDK), and/or other interfaces or instructions associated with the visual development interface and/or with one or more computing services providers that may host execution of the video game.

Figure 5:
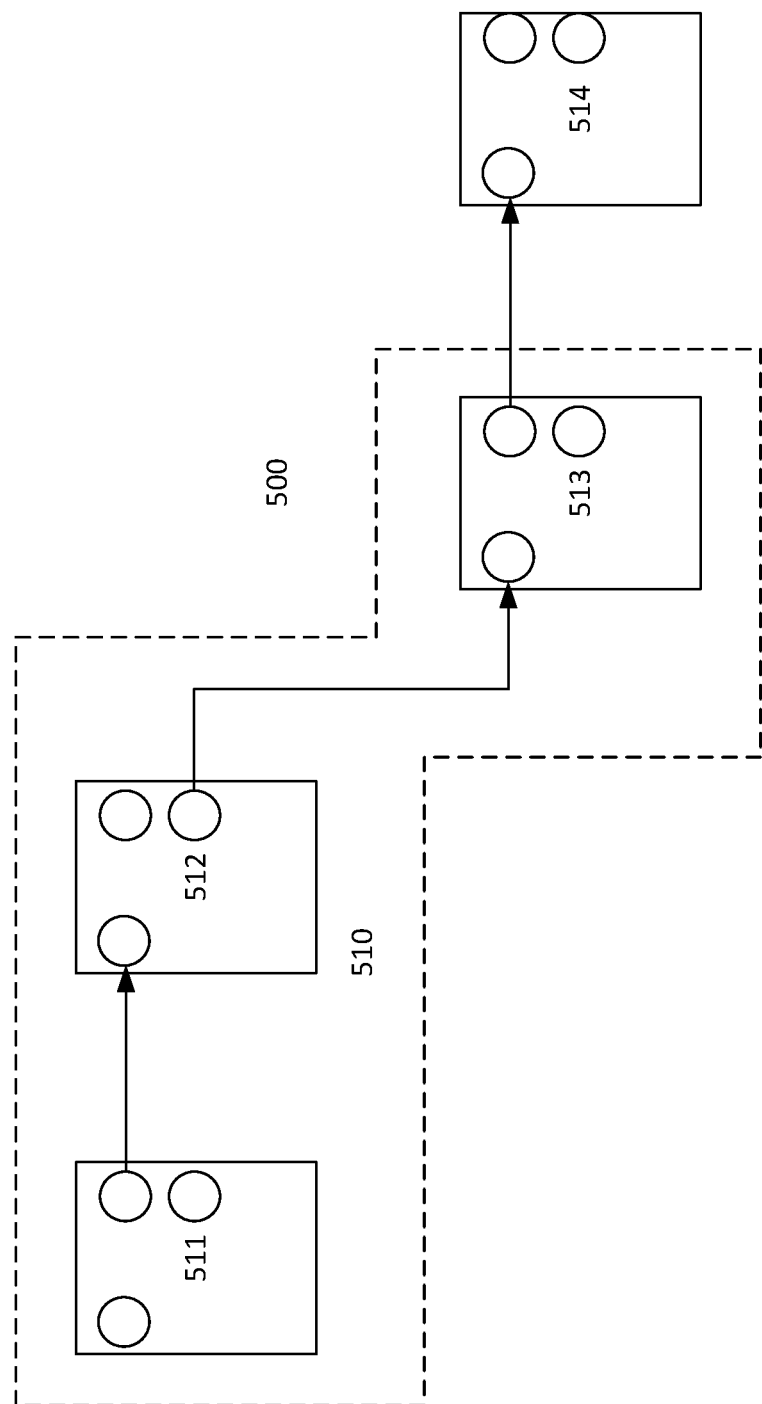
FIG. 5 is a diagram illustrating an example node slice selection set that may be used in accordance with the present disclosure.

As set forth above, another example technique for simplifying visual programming graphs may include combining and/or collapsing of multiple selected visual programming nodes into a single reusable visual programming node, referred to hereinafter as a visual programming slice. In some examples, a visual programming slice may be generated by receiving a selection of a set of programming nodes for inclusion in the slice, parsing the set of nodes to identify their associated inputs, outputs, and associated computing functions, de-duplicating the associated inputs and outputs, and then combining and/or collapsing the set of nodes into the visual programming slice. For example, in some cases, the combining and/or collapsing of the set of nodes may include examining and identifying the parsed computing functions associated with the underlying set of nodes, combining the identified computing functions in order, and then storing the ordered computing functions as the resulting set of computing instructions represented by the underlying set of nodes and associated with the slice. In some examples, the parsed computing functions may be ordered based, at least in part, on a layout associated with the visual programming graph from which the underlying set of nodes are selected. For example, in some cases, the layout of the visual programming graph may indicate an order in which the underlying selected set of nodes is to be executed. In some examples, the visual programming graph may be examined to identify an initial node in the selected set of nodes that will be executed first. In some cases, the order may continue by executing each node in the selected set of nodes that receives an input slot activation trigger from the initial node. The order may then repeatedly continue with nodes that receive an input slot activation trigger from the previous ordered nodes. Additionally, the order may also incorporate data provider nodes that provide data values to an input slot triggered node, for example by activating those data reference nodes first in order to provide necessary data values to the input slot triggered node as described in detail above. Thus, the computing functions included in the underlying set of nodes may be ordered based, at least in part, on a layout of the visual programming graph from which the nodes are selected. The ordered computing functions may then be used to form a resulting set of computing instructions represented by the underlying set of nodes and associated with the slice. The resulting visual programming slice may be executable to trigger execution of the resulting set of computing instructions in association with the inputs and outputs. In some examples, users may be able to select one or more empty placeholder inputs and/or empty placeholder outputs to be included in the resulting visual programming slice. These empty placeholder inputs and empty placeholder outputs may allow for additional inputs and/or outputs to be added into the slice after its initial creation. For example, the empty placeholder inputs and/or outputs may allow the slice to be easily customized for particular contexts and adapted to handle inputs and outputs that may not yet be known or fully developed. Referring now to FIG. 5, an example visual programming graph 500 is shown including visual programming nodes 511-514. In the example of FIG. 5, a user has selected nodes 511-513 for inclusion in a visual programming slice 510, as indicated by the dashed line surrounding nodes 511-513. In some examples, nodes 511-513 may be selected for inclusion in this visual programming slice by using an input control (e.g., mouse, touch-screen, etc.) to click on, or otherwise select, the desired nodes and/or by manually drawing a box or other shape around the desired nodes, for example in visual programming interface 111 of FIG. 1. In addition to selecting the desired nodes 511-513 for inclusion in slice 510, a user may also assign a name to the slice 510 and may also indicate various other users that are authorized to access the slice 510. Different types of access rights for slice 510 may also be assigned to different users, such as access to a locked version and/or unlocked version of the slice 510, each of which will be described in greater detail below with reference to FIGS. 7 and 8.

Figure 6:
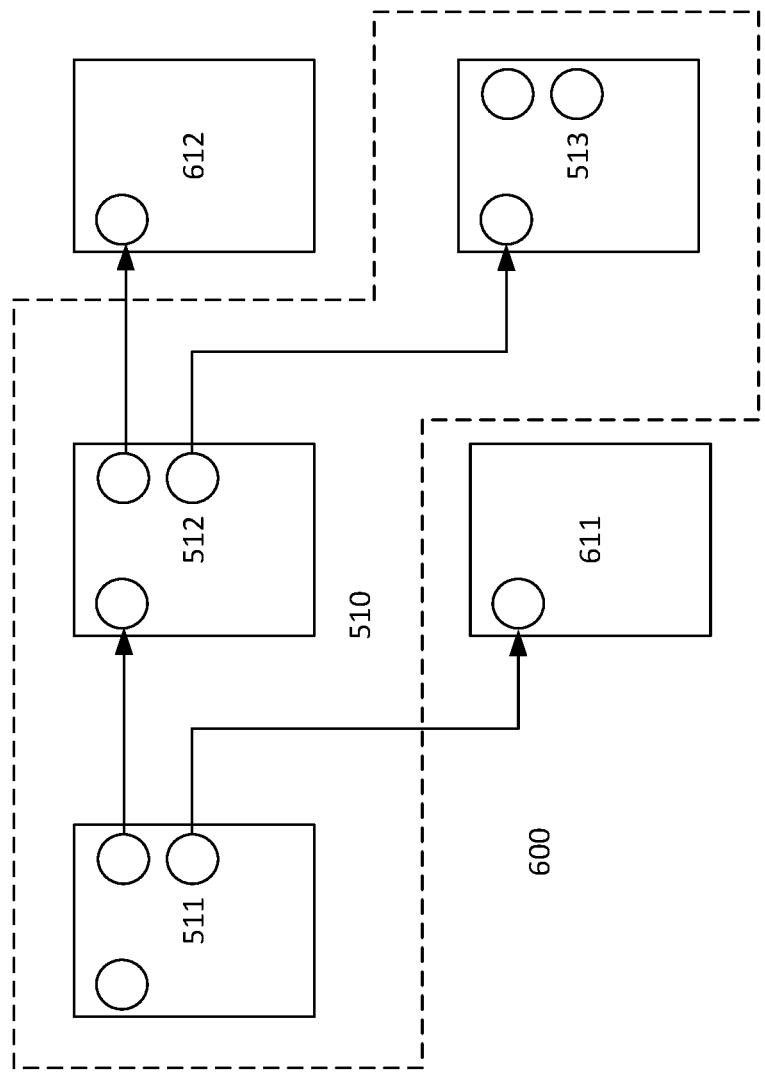
FIG. 6 is a diagram illustrating an example reused slice with attached nodes that may be used in accordance with the present disclosure.

Referring now to FIG. 6, it is seen that a copy of slice 510 may be retrieved and used in other visual programming graphs. For example, as shown in FIG. 6, slice 510 has been retrieved and copied into another visual programming graph 600. In some examples, slice 510 may be retrieved from a listing of available visual programming slices that may be provided by visual programming interface 111 of FIG. 1, for example based on the access rights of a current user of the visual programming interface 111. In the example of FIG. 6, visual programming slice 510 is customized by connecting additional nodes 611 and 612 to the slice 510. In some examples, visual programming slice 510 could be extended to include nodes 611 and 612. In other examples, a new visual programming slice could be generated that includes nodes 511, 512 and 513 as well as nodes 611 and 612.

In some examples, visual programming slices may improve efficiency by allowing sets of visual programming nodes to be instanced, used as templates, re-expanded, customized, modified, reduced, enlarged, and/or extended as needed. The use of visual programming slices may also, in some examples, reduce the size and complexity of visual programming graphs and allow graphs to easily inherit properties and other behaviors from one another. In some examples, visual programming slices may be used as templates. For example, using templates, video game or other designers may create slices that provide some basic level functionality, such as character behaviors, weapon or game item types, and many others. In some cases, entities within a video game may each include instances of the same visual programming slice, though some may override certain portions of their respective slice instance. Additionally, in some examples, inheritance may be achieved, as templates may be overridden on a per-instance basis, and overridden slices may themselves be used as slices, thus providing the ability to easily and efficiently allow for inheritance from root or other slices. As an example, a visual programming slice may include vehicle control logic VehicleControlBase, and this slice may have input control logic and expose pins for events such as OnForward, OnLeft, OnRight, OnBack, On Up, OnDown. Different slices may then be generated for different vehicle types. For example, for an AirplaneControl graph, OnLeft and OnRight may control banking. As another example, for a HelicopterControl graph, OnLeft and OnRight may control rotation. Furthermore, the AirplaneControl graph may itself be a slice, allowing subsequent creation of more specific controls, such as JetControl or CessnaControl. It is also noted that, in some examples, any number of visual programming slices may be nested within one another. For example, in FIGS. 5 and 6 node 512 may itself be a visual programming slice, which, in turn, may include any number of other nested visual programming slices. These abilities may be used to create custom complex behaviors. An example would be to create hierarchical state machines entirely through the use of visual programming slices.

Figure 7:
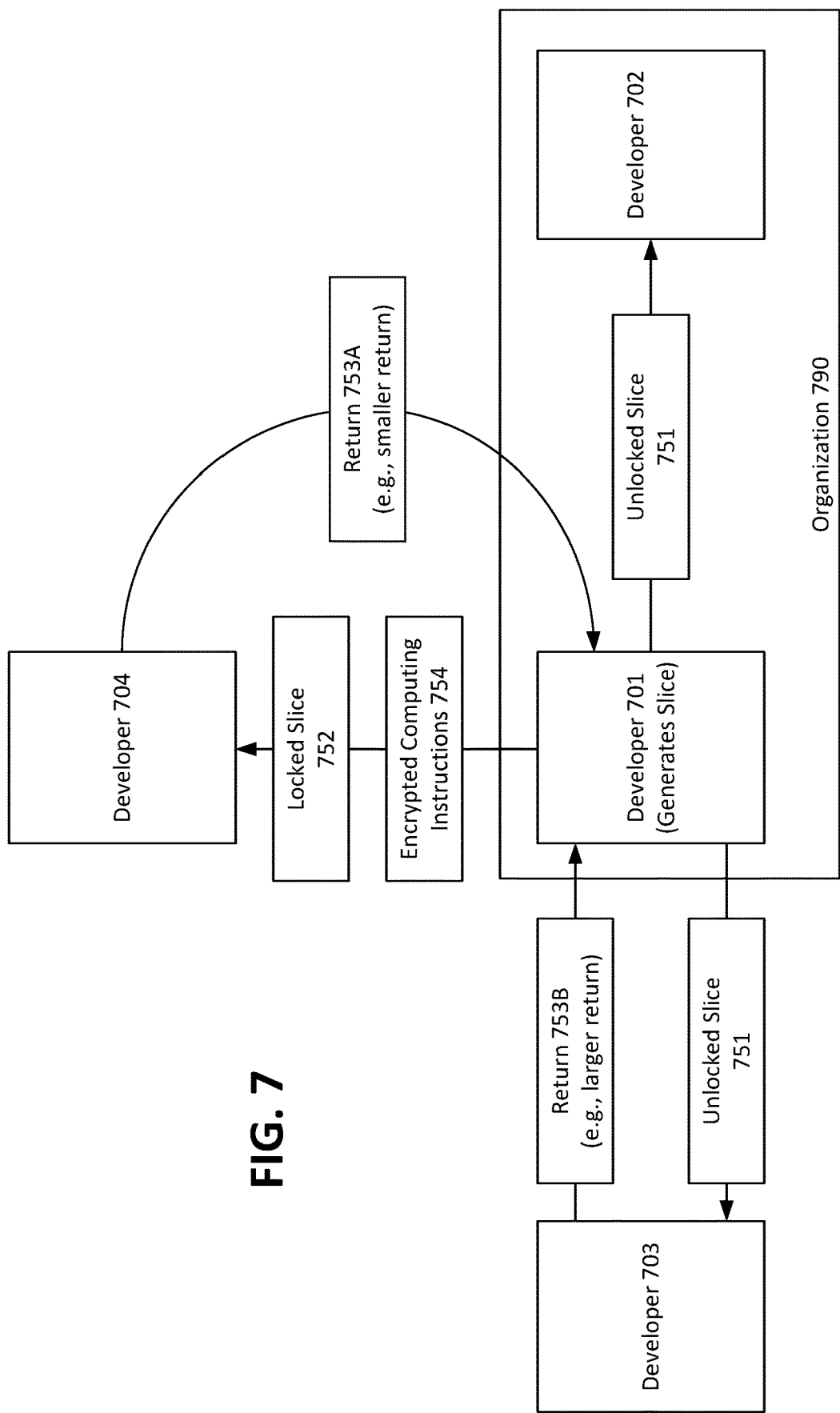
FIG. 7 is a diagram illustrating example locked and unlocked slices that may be used in accordance with the present disclosure.

In some examples, visual programming slices may be exposed using unlocked versions and/or locked versions. In particular, in some cases, an unlocked version of a slice may allow both the underlying set of visual programming nodes (i.e., nodes 511-513 for slice 510) and the respective set of computing instructions associated with the slice to be exposed and accessible to one or more users. By contrast, in some cases, a locked version of a slice may prevent both the underlying set of visual programming nodes and the respective set of computing instructions associated with the slice from being exposed and accessible to one or more users. Referring now to FIG. 7, some example exchanges of unlocked and unlocked slices will now be described in detail. In particular, as shown in FIG. 7, a developer 701 may generate a particular slice, for example using techniques such as those described above. In the example of FIG. 7, the developer 701 provides an unlocked slice 751 to developer

702. Because the unlocked slice 751 allows exposure of the underlying visual programming nodes and associated computing instructions, the unlocked slice 751 may be easily modified for various particular contexts. Developers 701 and 702 may participate in the same organization 790, such as the same company or enterprise. As such, developer 701 may be motivated to provide the unlocked slice 751 to developer 702 without receiving any compensation or other returns from developer 702.

As also shown in FIG. 7, developer 701 provides a locked slice 752 to developer 704. In the example of FIG. 7, developer 701 provides the locked slice 752 to developer 704 in exchange for a return 753A, such as compensation or other goods or services. In addition to the locked slice, developer 701 also provides encrypted computing instructions 754, which may be executed in response to an execution of locked slice 752. In some examples, locked slice 752 and encrypted computing instructions 754 may be provided to developer 704 along with rights management instructions and/or software that limits use of locked slice 752 and encrypted computing instructions 754 to developer 704. Also, in some examples, a third party rights management service and/or device may be employed to limit use of locked slice 752 and encrypted computing instructions 754 to developer 704. The encrypted computing instructions 754 allow the locked slice 752 to be used by developer 704 without revealing, to developer 704, the computing instructions that are used to implement the functionality represented by locked slice 752. This may prevent developer 704, and other users or developers, from copying or otherwise obtaining those computing instructions and executing them without the authority or permission of developer 701. Thus, by not exposing the underlying visual programming nodes or the underlying executable computing instructions associated therewith, locked slice 752 allows developer 702 to provide the locked slice 752 in exchange for a return 753A without the concern that the underlying visual programming nodes or the underlying executable computing instructions may be transferred, sold, and/or otherwise used in an unauthorized manner.

In some examples, however, in addition to merely using an existing slice, a developer may also wish to modify an existing slice to better conform to their particular execution context. For example, a developer may wish to rearrange, remove, or otherwise edit underlying nodes, node connections, data inputs, data outputs, signal inputs, signal outputs, and other features of a visual programming slice. It is noted, however, that because locked slice 752 does not expose the underlying set of nodes included in the slice, it may be difficult or impossible for a user of the underlying slice to edit certain underlying features of the locked slice. Thus, in some examples, it may be desirable for a developer to request unlocked slice 751 instead of locked slice 752, for example in cases when a developer wishes to edit and/or tweak certain underlying features of the slice. Also in some examples, because the unlocked slice 751 exposes the underlying set of nodes and associated computing instructions, a larger return may sometimes be provided in exchange for locked slice 751 than is provided in exchange for unlocked slice 752. In particular, in the example of FIG. 7, developer 701 provides unlocked slice 751 to developer 703 in exchange for return 753B, such as compensation or other goods or services. As shown in FIG. 7, return 753A provided in exchange for locked slice 752 may, in some examples, be a relatively smaller return (as indicated by the "e.g., smaller return" text included in return 753A). By contrast, return 753B provided in exchange for unlocked slice 751 may, in some examples, be a relatively larger return (as indicated by the "e.g., larger return" text included in return 753B).

Figure 8:
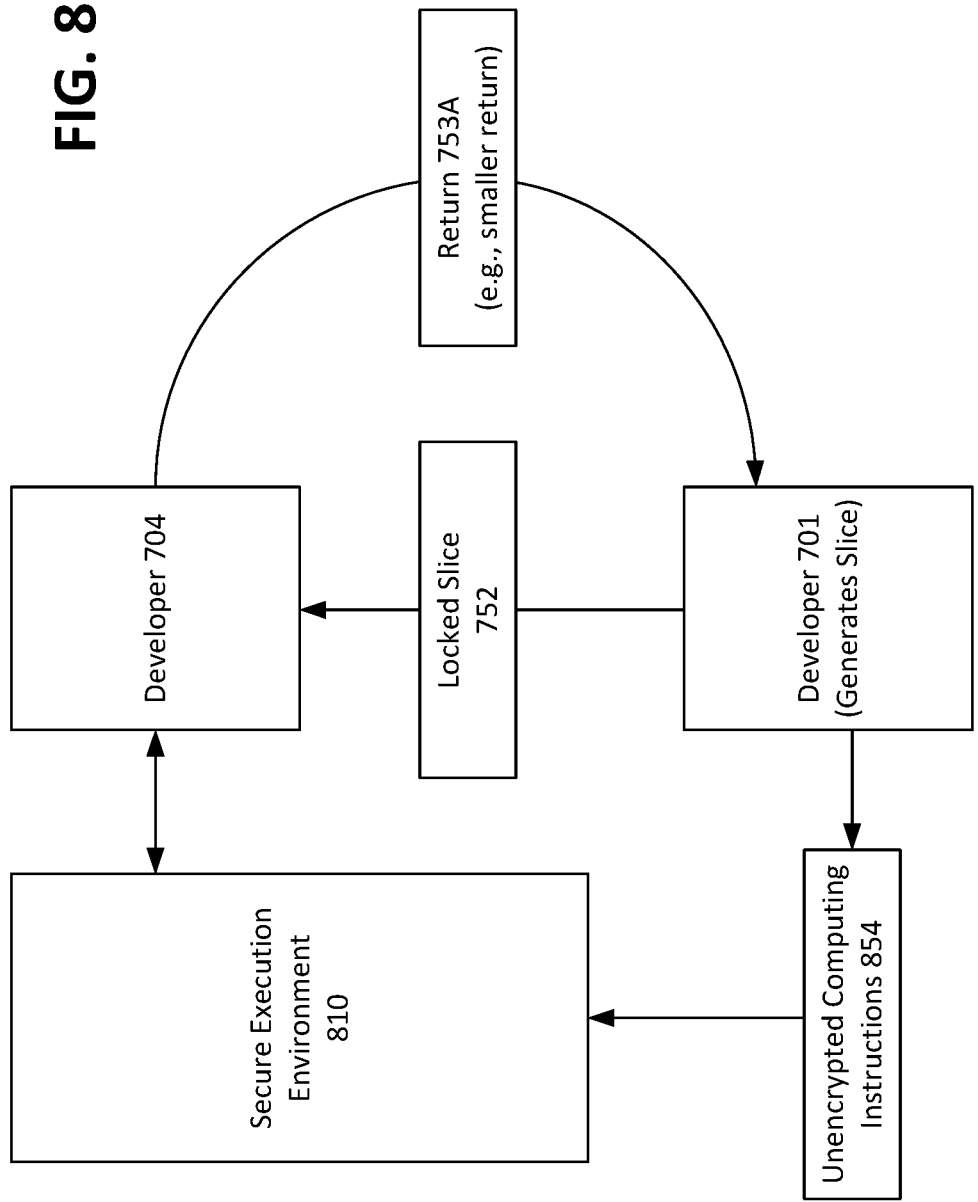
FIG. 8 is a diagram illustrating an example locked slice executed in a secure environment that may be used in accordance with the present disclosure.

As set forth above, locked slice 752 may, in some examples, be provided to developer 703 along with encrypted computing instructions 754 for implementing functionality represented by the locked slice 752. It is noted, however, that the use of encrypted computing instructions 754 is merely one example technique by which a locked slice may be securely exposed and other techniques may also be employed. Referring now to FIG. 8, another example technique for securely exposing locked slice 752 will now be described in detail. In particular, in the example of FIG. 8, similar to the prior example of FIG. 7, developer 701 provides locked slice 752 to developer 704. However, unlike FIG. 7, encrypted computing instructions 754 are not provided to developer 704. Rather, developer 701 instead provides unencrypted computing instructions 854 for implementing the locked slice 752 to a secure execution environment 810. In some examples, secure execution environment 810 may include one or more computing services and/or computing devices that may be employed by developer 704 to execute the locked slice 704 without exposing the unencrypted computing instructions 854 to the developer 704. In one particular example, secure execution environment 810 may be operated by a computing services provider that hosts execution of content developed by developer 704, such as video games and/or other electronic content. In some examples, the configuration shown in FIG. 8 may be preferable to the configuration shown in FIG. 7, for example because the configuration of FIG. 8 does not require encrypting of the computing instructions and/or transfer of the computing instructions to developer 704. In other examples, however, the configuration shown in FIG. 7 may be preferable, for example in scenarios when a secure execution environment may not be readily available or accessible or may require extra costs. Many other different example configurations may also be employed for securely exposing a locked slice 752.

Figure 9:
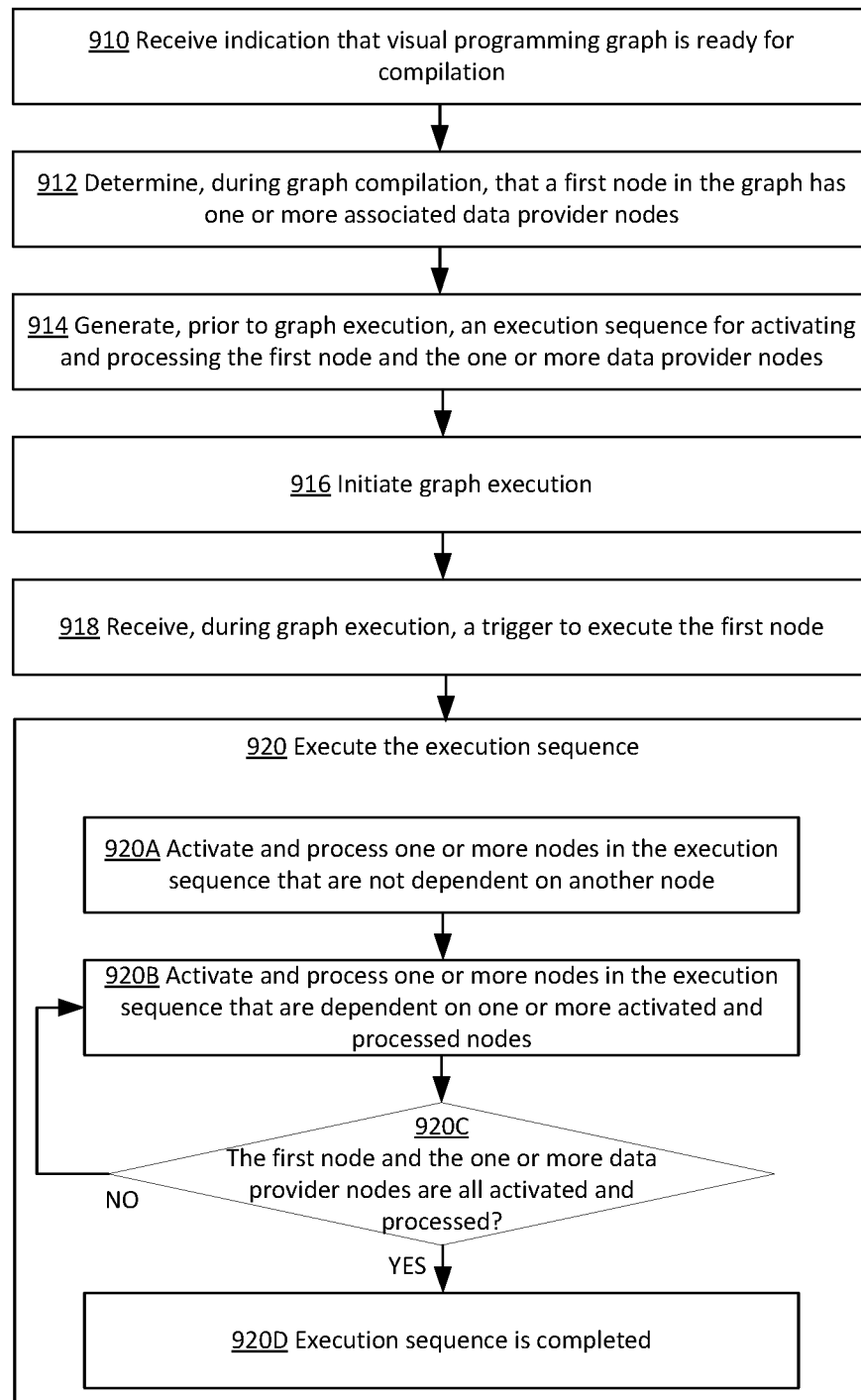
FIG. 9 is a flowchart illustrating an example process for executing at least part of a visual programming graph that may be used in accordance with the present disclosure.

FIG. 9 is a flowchart illustrating an example process for executing at least part of a visual programming graph that may be used in accordance with the present disclosure. The process of FIG. 9 is initiated at operation 910, at which an indication is received that a visual programming graph is ready for compilation. In particular, in some examples, a visual programming graph compilation process may be employed, prior to graph execution, in order to generate one or more execution sequences for certain nodes in the visual programming graph. In some examples, after designing a visual programming graph, a developer may indicate that the graph is ready for compilation, for example by selecting a ready for compilation option in a user interface menu (or other similar control) exposed by a visual programming interface. Selection of such a menu option or control may provide an indication that the graph is ready for compilation.

At operation 912, it is determined, during graph compilation, that a first node in the graph has one or more associated data provider nodes. For example, as set forth above, a visual programming node may be associated with one or more data provider nodes from which it directly or indirectly receives one or more data values. As also set forth above, in some examples, the first node may be connected, in the visual programming graph, to at least one of the one or more data provider nodes by connecting a data input slot of the first node to a data output slot of the at least one of the one or more data provider nodes. As shown in the example of FIG. 3, a visual programming interface may employ a first directionality (e.g., left to right) to express flow of signals between nodes and a second directionality (e.g., top to bottom) to express transfer of data values between nodes, and the first directionality may be different from the second directionality.

At operation 914, an execution sequence for activating and processing the first node and the one or more data provider nodes is generated prior to execution of the visual programming graph. For example, during compilation of the visual programming graph, an execution sequence may be generated for each node in the graph with one or more connected signal input slot triggers. In some examples, the execution sequence may be generated based, at least in part, on a depth-first search of a portion of the visual programming graph extending from one or more data input slots of the first node. The execution sequence may include activating and processing one or more nodes that are not dependent on another node and subsequently activating and processing one or more nodes that are dependent on one or more activated and processed nodes until the one or more data provider nodes and the first node are activated and processed. In this context, a given node may be considered dependent on one or more nodes from which the given node receives one or more data values. Thus, a node that is not dependent on another node may be a node that does not receive data values from another node. In some examples, determination of one or more node execution sequences prior to execution of the visual programming graph may improve efficiency and reduce the start-up time delay required prior to graph execution.

At operation 916, execution of the visual programming graph is initiated. In some examples, execution of the visual programming graph may be requested by a developer or other user or may be triggered based on an event and/or condition occurring in an executing video game or another executing program or process. At operation 918, at some point during execution of the visual programming graph, an input is received to trigger execution of the first node. For example, a signal input slot of the first node may be connected to a signal output slot of another node, and a trigger to execute the first node may be a signal received at the signal input slot of the first node from the signal output slot of the other node.

At operation 920, the execution sequence for the first node is executed. As shown in FIG. 9, the execution of the execution sequence may include sub-operations 920A-D. In particular, at sub-operation 920A, one or more nodes in the execution sequence that are not dependent on another node are activated and processed. For example, as shown in FIG. 4, the execution sequence for node 412 includes one node that is not dependent on another node (i.e., data provider node 413). Thus, in the example of FIG. 4, data provider node 413 may be activated and processed at sub-operation 920A in order to provide its data value to data provider node 414. At sub-operation 920B, one or more nodes in the execution sequence that are dependent on one or more activated and processed nodes may be activated and processed. In particular, in the example of FIG. 4, once data provider node 413 has been activated and processed, data provider node 414 will be dependent on an activated and processed node. Thus, at a first iteration of sub-operation 920B, data provider node 414 may be activated and processed in order to provide its data value to node 412. At sub-operation 920C, it is determined whether the first node and the one or more data provider nodes have all been activated and processed. If not, then the process may return to sub-operation 920B. In particular, in the example of FIG. 4, upon activation and processing of data provider node 414, node 412 will not yet have been activated and processed. Thus, at a second iteration of sub-operation 920B, node 412, which is dependent upon prior activated and processed node 414, may be activated and processed based on the data value provided by node 414. Then, at a second iteration of sub-operation 920C, it may be determined that the first node (e.g., node 412) and the one or more data provider nodes (e.g., nodes 413 and 414) have all been activated and processed. The execution sequence may then be completed at sub-operation 920D. It is noted that, in some examples, sub-operation 920B may include activating and processing only those nodes that depend from other nodes that have all been activated and processed. Thus, in some examples, a particular node may not be activated and processed until each data provider node on which the particular node depends has been activated and processed. As set forth above, in some examples, the visual programming graph may be executed over a plurality of execution frames. Also, in some examples, the first node and the one or more data provider nodes may be activated and processed during a same execution frame. The activating and processing of the first node and the one or more data provider nodes during the same execution frame may ensure that one or more data values provided by the one or more data provider nodes are current values when used in the same execution frame. In some examples, the first node (e.g., node 412) may provide an output signal to trigger execution of another node in a subsequent execution frame.

Figure 10:
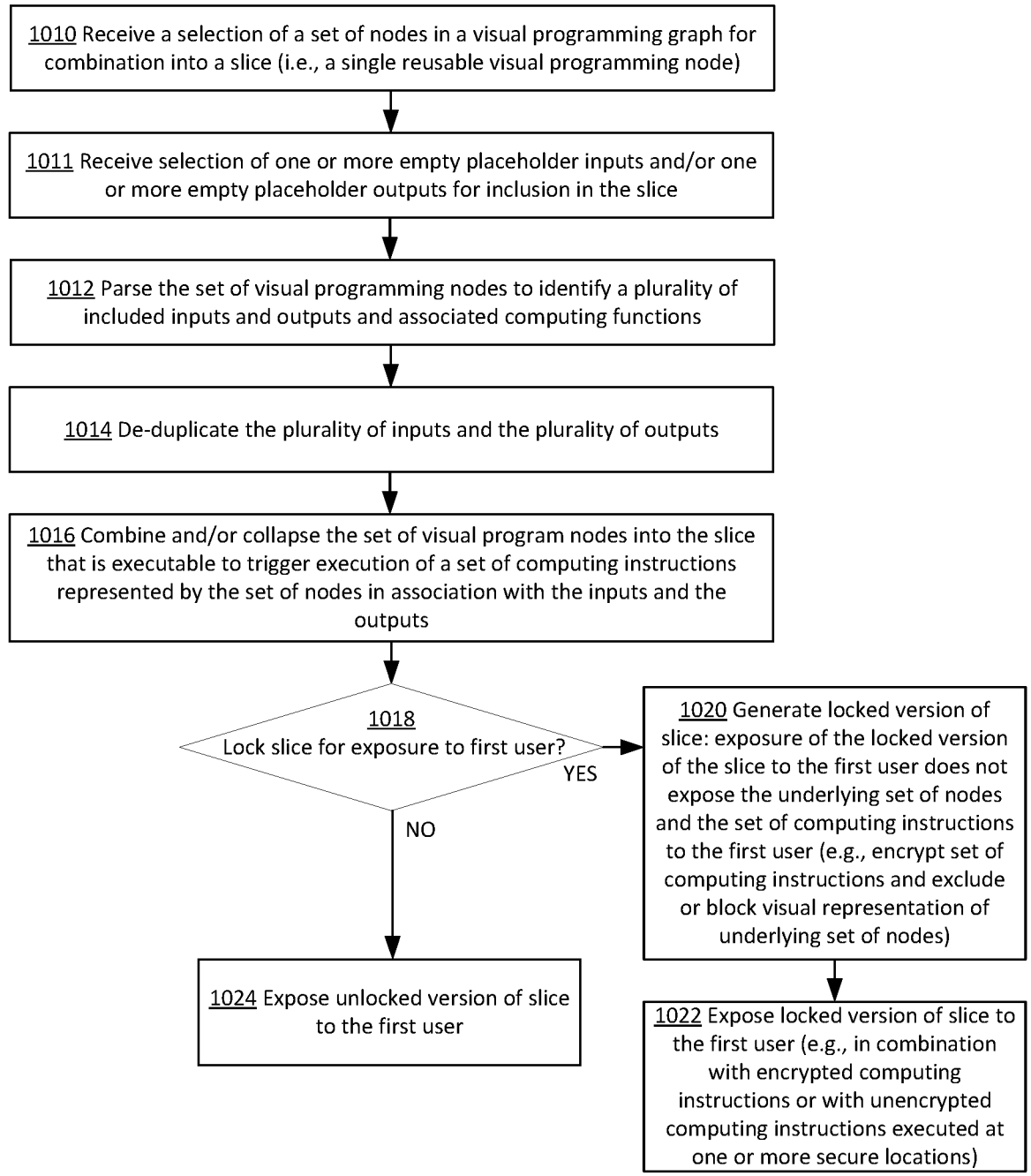
FIG. 10 is a flowchart illustrating an example process for exposing at least part of a visual programming graph that may be used in accordance with the present disclosure.

FIG. 10 is a flowchart illustrating an example process for exposing at least part of a visual programming graph that may be used in accordance with the present disclosure. The process of FIG. 10 is initiated at operation 1010, at which a selection of a set of visual programming nodes in a visual programming graph for inclusion in a visual programming slice (i.e., a single reusable visual programming node) is received. As set forth above, the set of nodes may be selected using an input control (e.g., mouse, touch-screen, etc.) to click on, or otherwise select, the desired nodes and/or by manually drawing a box or other shape around the desired nodes, for example in visual programming interface 111 of FIG. 1. The selected set of visual programming nodes may include a plurality of inputs (e.g., signal inputs and/or data inputs) and a plurality of outputs (e.g., signal inputs and/or data inputs) and may be associated with a plurality of computing functions. As set forth above, in some cases, the selected set of visual programming nodes may include a nested slice that is a combination of another set of other visual programming nodes.

At operation 1011, a selection of one or more empty placeholder inputs and/or one or more empty placeholder outputs is received for inclusion in the resulting slice. As set forth above, in some examples, one or more empty placeholder inputs and/or empty placeholder outputs may be included in the plurality of inputs and/or the plurality of outputs and selected for inclusion in the resulting slice. The one or more empty placeholder inputs may be inputs to one or more of the nodes selected for inclusion in the slice, while the one or more empty placeholder outputs may be outputs from one or more of the nodes selected for inclusion in the slice. These empty placeholder inputs and empty placeholder outputs may allow for additional inputs and/or outputs to be added into the slice after its initial creation. For example, the empty placeholder inputs and/or outputs may allow the slice to be easily customized for particular contexts and adapted to handle inputs and outputs that may not yet be known or fully developed. In some examples, a set of computing instructions associated with the resulting slice may be updated when empty placeholder inputs and/or empty placeholder outputs are eventually provided.

At operation 1012, the set of visual programming nodes is parsed to identify the plurality of inputs (including empty placeholder inputs, if any), the plurality of outputs (including empty placeholder outputs, if any), and the associated computing functions. For example, each node in the set of visual programming nodes may have associated code or other data that may identify the node's included inputs and outputs and associated computing functions represented by the node, and this associated code or other data may be parsed to identify the plurality of inputs, the plurality of outputs, and the associated computing functions. In some examples, the associated code or other data may include tags or other data values to appropriately identify the inputs, outputs and associated computing functions. At operation 1014, the plurality of inputs and the plurality of outputs included in the set of nodes is de-duplicated, for example by removing multiple instances of a common input that is received by multiple nodes in the set of nodes and removing multiple instances of a common output that is provided by multiple nodes in the set of nodes. In some examples, the resulting slice may include the plurality of inputs and the plurality of outputs after de-duplication.

At operation 1016, the set of visual programming nodes is combined and/or collapsed into a slice that is executable to trigger execution of a set of computing instructions represented by set of nodes in association with the plurality of inputs and the plurality of outputs. For example, the visual programming slice may be assigned a corresponding name or other identifier and may be stored and retrieved using the corresponding name or other identifier. Additionally, the visual programming slice may be visually represented in one or more visual programming graphs using only a single node. In some examples, however, the single node that visually represents the slice may be re-expanded to show the underlying set of nodes. As set forth above, the combining and/or collapsing of the set of nodes may include examining and identifying the parsed computing functions associated with the underlying set of nodes, combining the identified computing functions in order, and then storing the ordered computing functions as the resulting set of computing instructions represented by the underlying set of nodes and associated with the slice. Furthermore, the visual programming slice may be associated with the plurality of inputs, the plurality of outputs, and the set of computing instructions using stored code or other stored data corresponding to the visual programming slice.

At operation 1018, it is determined whether the slice will be locked for exposure to a first user. If the slice will be locked for exposure to the first user, then the process proceeds to operation 1020, at which a locked version of the slice is generated. As set forth above, exposure of the locked version of the slice to the first user does not expose the underlying set of visual programming nodes and the respective set of computing instructions to the first user. Thus, in some examples, generation of the locked version of the slice may include encrypting the set of computing instructions associated with the slice and/or providing the set of computing instructions to one or more secure locations at which the set of computing instructions may be executed and kept inaccessible to the first user. Additionally, generation of the locked version of the slice may include excluding or blocking visual representations of the underlying set of nodes from being included in (or retrievable from) the slice. At operation 1022, the locked version of the slice may be exposed to the first user for executing of the set of computing instructions. In some examples, such as shown in FIG. 7, the locked version of the slice may be provided to the first user in combination with an encrypted version of the set of computing instructions. Also, in some examples, such as shown in FIG. 8, the locked version of the slice may be provided to the first user, and execution of the locked slice may cause executing of the set of computing instructions at one or more secure locations at which the set of computing instructions are inaccessible to the first user.

If, at operation 1018, it is determined that the slice will not be locked for exposure to the first user, then, at operation 1024, an unlocked version of the slice may be exposed to the first user for executing of the set of computing instructions. As set forth above, exposure of the unlocked version of the slice to the first user may allow both the underlying set of visual programming nodes and the respective set of computing instructions associated with the slice to be exposed to the first user. In some examples, the unlocked version of the slice may be advantageous, for example by allowing the slice to be easily modified for various particular contexts. It is noted, however, that, in some examples, regardless of whether a locked or an unlocked version of the slice is exposed to the first user, the first user may still connect one or more additional visual programming nodes to the first slice, for example in another visual programming graph. This may allow the first slice to be extended and/or customized for use in one or more execution contexts as desired by the first user.

Figure 11:
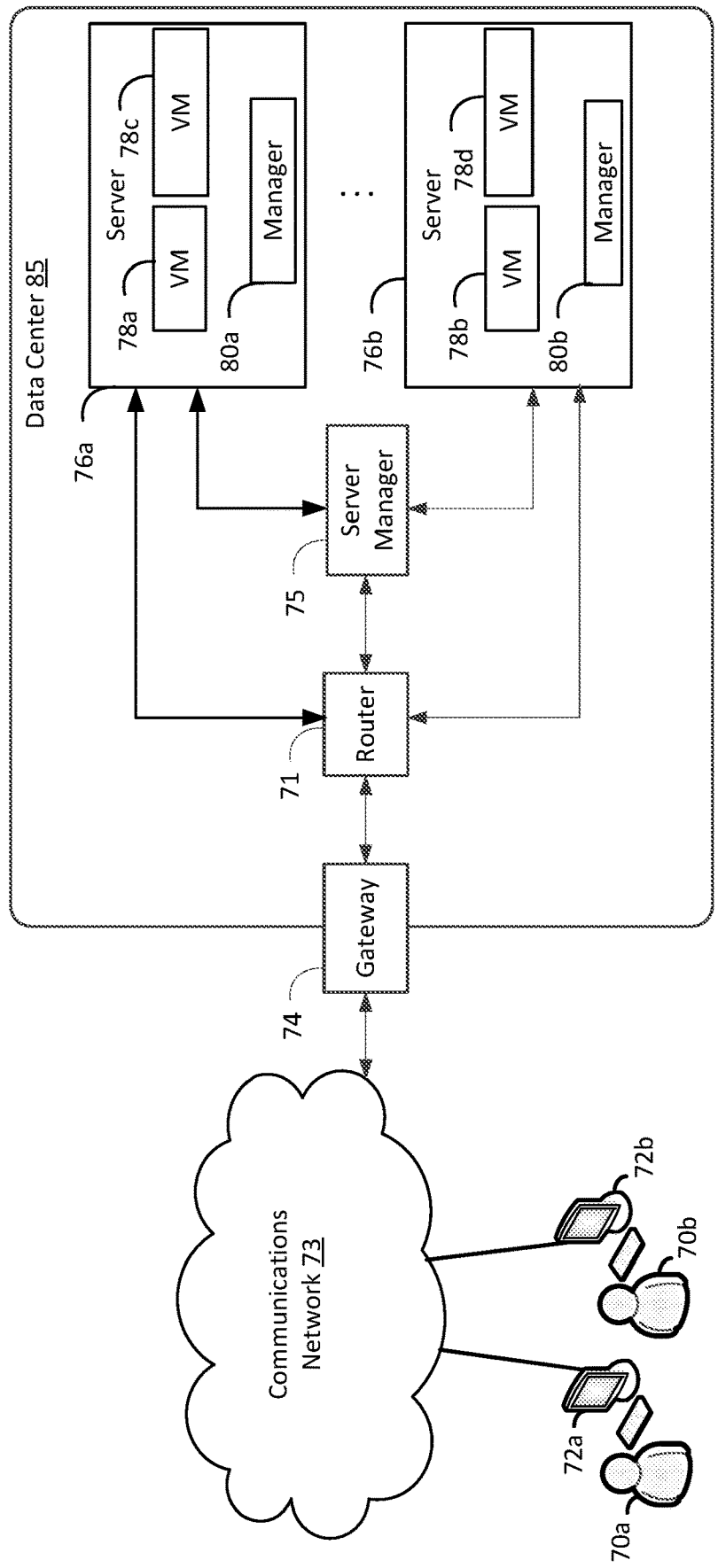
FIG. 11 is a diagram illustrating an example system for transmitting and providing data that may be used in accordance with the present disclosure.

An example system for transmitting and providing data will now be described in detail. In particular, FIG. 11 illustrates an example computing environment in which the embodiments described herein may be implemented. FIG. 11 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 11, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 11 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 11, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 11, a server manager 75 is also employed to at least in part direct various communications to, from and/or between servers 76a and 76b. While FIG. 11 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 85 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 12:
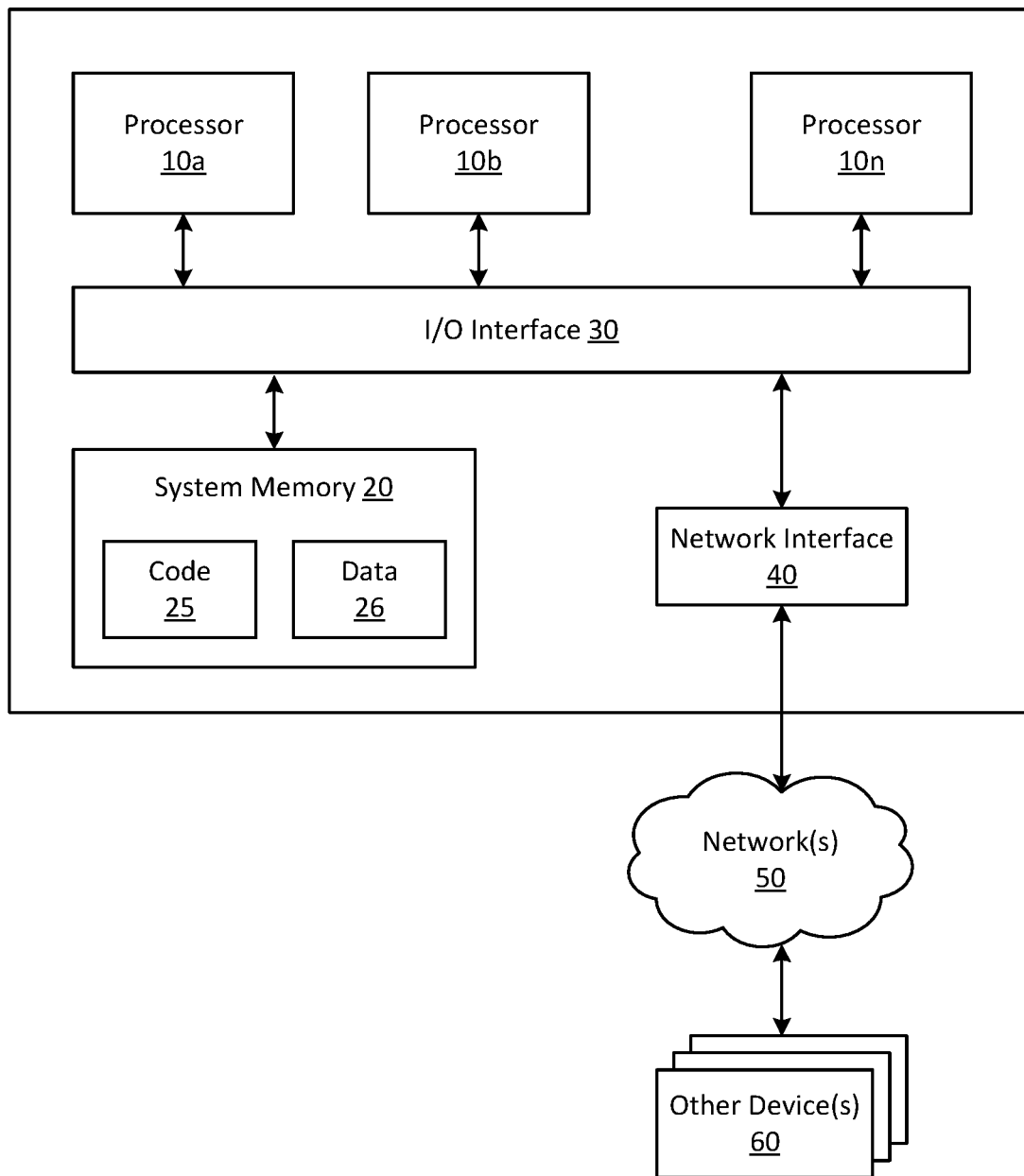
FIG. 12 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 12 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for exposing at least part of a visual programming graph comprising:
   one or more processors; and
   one or more memories having stored therein instructions that, upon execution by the one or more processors, cause the computing system perform operations comprising:
   receiving a selection of a set of visual programming nodes in the visual programming graph, wherein the set of visual programming nodes includes a plurality of inputs and a plurality of outputs and is associated with a plurality of computing functions;
   parsing the set of visual programming nodes to identify the plurality of inputs, the plurality of outputs, and the plurality of computing functions;
   collapsing the set of visual programming nodes into a single reusable visual programming node that is executable to trigger execution of a set of computing instructions represented by the set of visual programming nodes in association with the plurality of inputs and the plurality of outputs;
   generating a locked version of the single reusable visual programming node; and
   exposing the locked version of the single reusable visual programming node to a user, wherein the locked version of the single reusable visual programming node allows the user to cause execution of the single reusable visual programming node without allowing the set of visual programming nodes and the set of computing instructions to be exposed to the user, wherein an encrypted version of the set of computing instructions is provided to the user in combination with the locked version of the single reusable visual programming node, and wherein the encrypted version of the set of computing instructions is executed in response to execution of the locked version of the single reusable visual programming node.

2. The computing system of claim 1, wherein at least one of an empty placeholder input in the plurality of inputs or an empty placeholder output in the plurality of outputs is selectable for inclusion in the single reusable visual programming node.

3. A computer-implemented method for exposing at least part of a visual programming graph comprising:
   receiving a selection of a set of visual programming nodes in the visual programming graph, wherein the set of visual programming nodes includes a plurality of inputs and a plurality of outputs and is associated with a plurality of computing functions;
   parsing the set of visual programming nodes to identify the plurality of inputs, the plurality of outputs, and the plurality of computing functions; and
   combining the set of visual programming nodes into a single reusable visual programming node that is executable to trigger execution of a set of computing instructions represented by the set of visual programming nodes in association with the plurality of inputs and the plurality of outputs;
   generating a locked version of the single reusable visual programming node; and
   exposing the locked version of the single reusable visual programming node to a user, wherein the locked version of the single reusable visual programming node allows the user to cause execution of the single reusable visual programming node without allowing the set of visual programming nodes and the set of computing instructions to be exposed to the user, wherein an encrypted version of the set of computing instructions is provided to the user in combination with the locked version of the single reusable visual programming node, and wherein the encrypted version of the set of computing instructions is executed in response to execution of the locked version of the single reusable visual programming node.

4. The computer-implemented method of claim 3, further comprising de-duplicating the plurality of inputs and the plurality of outputs, wherein the single reusable visual programming node includes the plurality of inputs and the plurality of outputs after de-duplication.

5. The computer-implemented method of claim 3, wherein at least one of an empty placeholder input in the plurality of inputs or an empty placeholder output in the plurality of outputs is selectable for inclusion in the single reusable visual programming node.

6. The computer-implemented method of claim 3, wherein the set of visual programming nodes includes a nested combined visual programming node that is a combination of another set of visual programming nodes.

7. The computer-implemented method of claim 3, wherein one or more additional visual programming nodes are connectable to the single reusable visual programming node in another visual programming graph.

8. One or more non-transitory computer-readable storage media having stored thereon instructions that, upon execution by one or more computing devices, cause the one or more computing devices to perform operations comprising:
receiving a selection of a set of visual programming nodes in a visual programming graph, wherein the set of visual programming nodes includes a plurality of inputs and a plurality of outputs and is associated with a plurality of computing functions;
parsing the set of visual programming nodes to identify the plurality of inputs, the plurality of outputs, and the plurality of computing functions; and
combining the set of visual programming nodes into a single reusable visual programming node that is executable to trigger execution of a set of computing instructions represented by the set of visual programming nodes in association with the plurality of inputs and the plurality of outputs;
generating a locked version of the single reusable visual programming node; and
exposing the locked version of the single reusable visual programming node to a user, wherein the locked version of the single reusable visual programming node allows the user to cause execution of the single reusable visual programming node without allowing the set of visual programming nodes and the set of computing instructions to be exposed to the user, wherein an encrypted version of the set of computing instructions is provided to the user in combination with the locked version of the single reusable visual programming node, and wherein the encrypted version of the set of computing instructions is executed in response to execution of the locked version of the single reusable visual programming node.

9. The one or more non-transitory computer-readable storage media of claim 8, wherein the operations further comprise de-duplicating the plurality of inputs and the plurality of outputs, wherein the single reusable visual programming node includes the plurality of inputs and the plurality of outputs after de-duplication.

10. The one or more non-transitory computer-readable storage media of claim 8, wherein at least one of an empty placeholder input in the plurality of inputs or an empty placeholder output in the plurality of outputs is selectable for inclusion in the single reusable visual programming node.

11. The one or more non-transitory computer-readable storage media of claim 8, wherein the set of visual programming nodes includes a nested combined visual programming node that is a combination of another set of visual programming nodes.

12. The one or more non-transitory computer-readable storage media of claim 8, wherein one or more additional visual programming nodes are connectable to the single reusable visual programming node in another visual programming graph.

* * * * *